Figure 1:
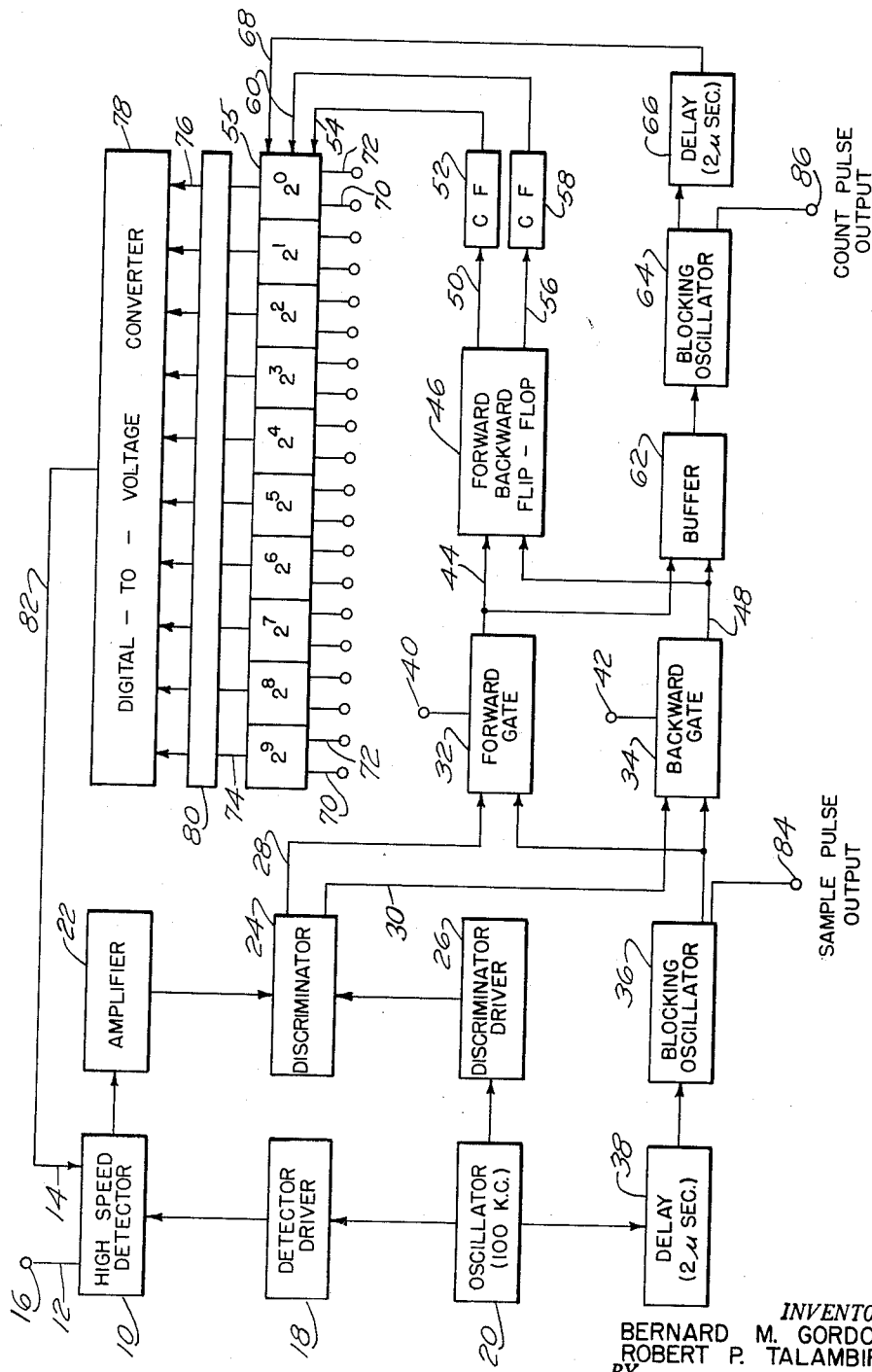

Nov. 6, 1962  B. M. GORDON ET AL  3,063,018
SIGNAL AMPLITUDE COMPARATOR
Original Filed July 22, 1955  2 Sheets-Sheet 1

FIG. I

INVENTORS
BERNARD M. GORDON
ROBERT P. TALAMBIRAS
BY
Joseph Weingarten
ATTORNEY

INVENTORS
BERNARD M. GORDON
ROBERT P. TALAMBIRAS
BY
ATTORNEY

United States Patent Office 3,063,018
Patented Nov. 6, 1962

3,063,018
SIGNAL AMPLITUDE COMPARATOR
Bernard M. Gordon, Newton, and Robert P. Talambiras, Auburndale, Mass., assignors to Epsco, Incorporated, Cambridge, Mass., a corporation of Massachusetts
Original application July 22, 1955, Ser. No. 523,798. Divided and this application Nov. 5, 1959, Ser. No. 851,126
10 Claims. (Cl. 328—147)

This application is a division of our pending application, Serial No. 523,798, filed July 22, 1955, entitled Information Translating Apparatus and Method.

This invention relates in general to information translating apparatus of the type which converts analog information to digitally coded information by a method of successive approximations and more particularly pertains to a signal comparison device adapted to be utilized in such apparatus.

With the development of high speed digital and analog computing devices, the need has arisen for high speed translating devices for converting information from analog to digital form and reversely from digital form to analog form. Such apparatus allows the operation in one system of devices using information in various forms by allowing their linkage. In order to preserve the advantages of the modern computers, such apparatus must be able to rapidly and continuously convert information presented to it.

It is therefore the principal object of this invention to provide a signal comparator for comparing two signals and, where an unbalance exists between the compared signals, furnishing an output indicative of the sense of the unbalance, viz, an output indicating which of the two signals is the greater.

It is a further object of this invention to provide a signal comparator able to perform satisfactorily at the high rates of comparison required by modern high speed computing devices.

The invention resides in an arrangement of apparatus which includes a resistive network on which the two compared signals are impressed, a network providing no output when the compared signals are balanced and in other cases providing a D.C. unbalance signal whose polarity is determined by the sense of unbalance of the two signals. An oscillator provides a timing signal which causes a signal chopping device periodically to interrupt the unbalance signal so that there is provided a train of unbalance pulses. Each unbalance pulse is amplified and differentiated to provide a pair of differentiated pulses derived from the leading and trailing edges of the unbalance pulse. Only one of the differentiated pulses is required and the differentiated pulse derived from the trailing edge of the unbalance pulse is preferred. The differentiated pulses are applied to the input of a paraphase amplifier which provides two oppositely phased outputs, each phased output being fed into a different output line. The phased outputs are, in effect, simultaneously gated by a pair of bridge networks controlled by the timing oscillator. The bridge networks cause the output lines to be periodically clamped to a reference potential to shunt the phased outputs. At other times the bridges unclamp the output lines from the reference potential so that the phased outputs are gated out. The bridges unclamp the output lines for an interval sufficient to pass only the phased outputs derived from the differentiated trailing edge of the unbalance pulse.

Figure 2:
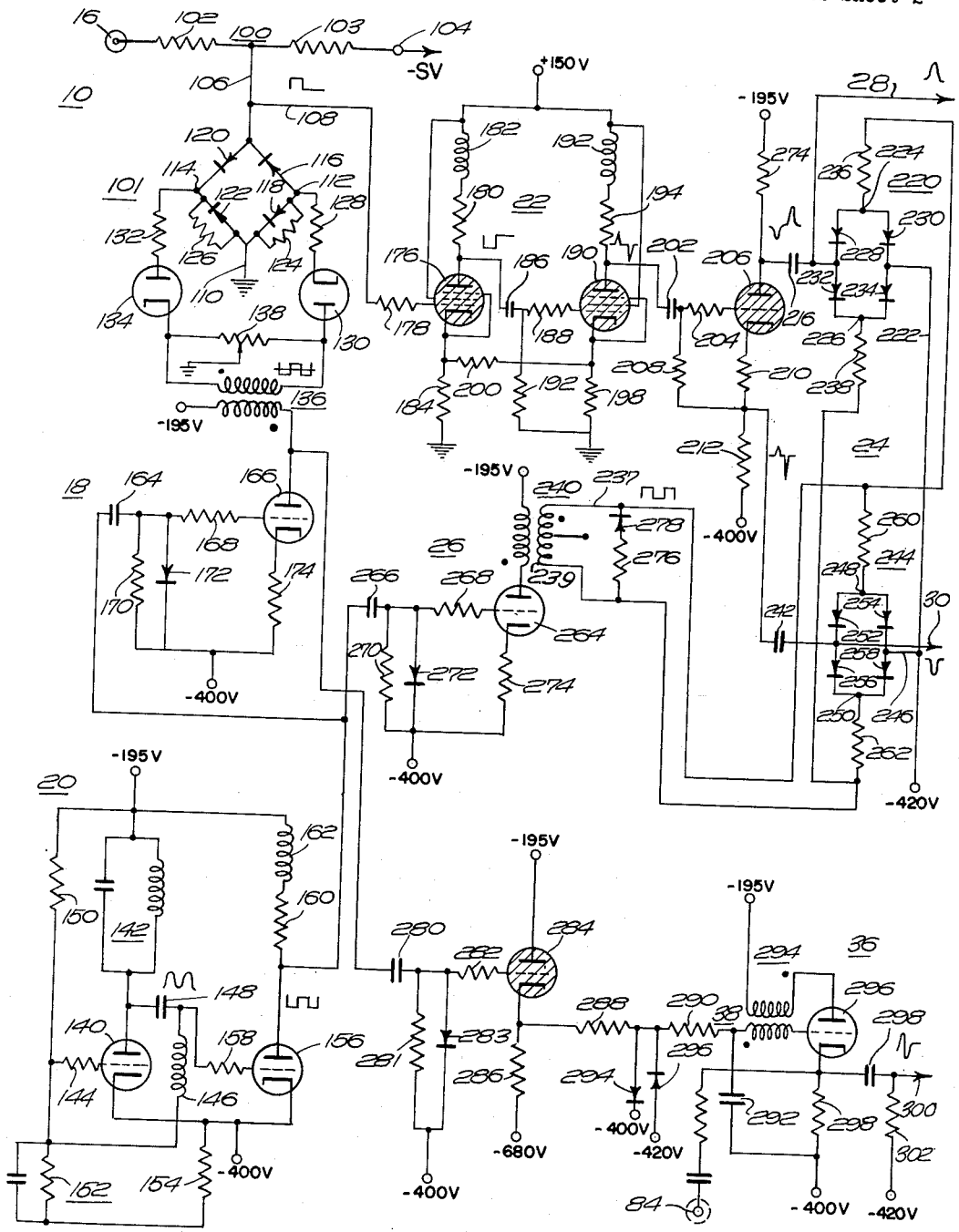

The arrangement and mode of operation of the invention can be more fully understood by a perusal of the following detailed description when considered in conjunction with the drawings, in which:

FIGURE 1 is a block diagram illustrating an information translating apparatus embodying the invention, FIGURE 2 illustrates in schematic form the detecting and discriminating circuits of FIGURE 1.

In the annexed drawings, like parts are identified by like reference characters and values of potential are given only for the purposes of illustration and not to limit the scope of the invention.

Referring to FIGURE 1 which illustrates the information storing apparatus in block form, a high speed detector 10 is provided with first and second information input leads 12 and 14. The input lead 12 of detector 10 is adapted to receive information in analog form from a terminal 16. The externally derived information may be continuously varying and may have the form of a voltage signal. The external signal may, however, also have other aspects including current and impedance forms.

The signals delivered to the signal input terminal 14 of the detector 10 are derived internally and are also in analog form. The signals delivered to terminal 14 may also have voltage, current, or impedance aspects.

The high speed detector 10 is periodically energized by a detector driver 18 which is excited by an oscillator 20 which may have a frequency of 100 kilocycles.

When the high speed detector 10 is energized, it produces an output signal corresponding to the relationship of the signals delivered respectively to the input leads 12 and 14. This output signal is delivered through an amplifier 22 to a discriminator 24. The discriminator 24 is energized by a discriminator driver 26 which is also stimulated by the oscillator 20.

The discriminator 24 delivers a control signal over its second output line 28 when the signal is below the predetermined value, and delivers a control signal over its second output line 30 when this signal is above the predetermined value.

The output line 28 delivers its signal to the first input terminal of a forward gate 32, while the other output line 30 of the discriminator 24 delivers its signal to the first input terminal of a backward gate 34.

The second input terminals of the forward and backward gates 32, 34, are energized by the output signal from a blocking oscillator 36. The blocking oscillator 36 is stimulated by the oscillator 20 through a delay element 38. By this means the blocking oscillator 36 in effect delivers a timing signal to the forward and backward gates 32, 34.

The forward and backward gates 32, 34 are each provided with a control terminal 40, 42 for respectively conditioning the delivery of signals therethrough.

Assuming that permissive signals are delivered to the control terminals 40, 42, the concurrence of signals at both input terminals of the forward gate allows the delivery of a signal to the output line 44, while the concurrence of input signals to the backward gate 34 results in the delivery of an output signal over the line 48.

A forward backward flip-flop 46 has its first and second input terminals respectively energized by the output lines 44 and 48. When the output line 44 is energized, the flip-flop 46 assumes a state delivering a signal over its output line 50 through a cathode follower 52 to the forward control line 54 of a storage or reversible binary counting device 55. When a signal is delivered to the flip-flop 46 by the line 48, it assumes its other stable state, delivering an output signal to its line 56. This signal is delivered through a cathode follower 58 to the backward control line 60 of the counter 55.

The signals appearing on the gate output lines 44 and 48 are delivered through a buffer 62 to the input of a blocking oscillator 64. If the signal delivered to the blocking oscillator 64 is greater than a predetermined minimum threshold value, it delivers an output signal through a delay element 66 to the input count line 68 of the counting device 55. The delay element 66 assures sufficient time for the counting device 55 to assume its forward or backward state before the count signal is delivered to it.

The binary counting device 55 is of the reversible type controlled by the input lines 54, 60 and increases or decreases its stored count when an input signal is delivered to its input line 68 in accordance with the control signals received. The count information stored in the counting device 55 is available in bipolar digital code over the respective sets of output leads 70 and 72.

The information output signal of the binary counting device 55 is also delivered over a plurality of output lines 74 to a corresponding series of input leads 76 of a digital-to-voltage converter 78 by a connecting plug 80. The digital-to-voltage converter 78 produces at its output lead 82, a signal which has an amplitude related to the count of the binary counting device 55. The amplitude signal on line 82 is delivered to the second input line 14 of the high speed detector 10. Thus the information stored in digital form by the counting device 55 is converted to a corresponding analog form and is delivered to the high speed detector 10 for comparison with the external analog signal received by its input line 12.

*Operation*

The information translating apparatus is also provided with a sample pulse output terminal 84 and a count pulse output terminal 86 delivering signals which may be useful in operating and coordinating other related and auxiliary equipment.

In the operation of the information translating apparatus, the high speed detector 10 compares the external analog signal received over its first input line 12 with the internally derived analog signal delivered over second input line 14. When the detector 10 is periodically energized by the detector driver 18, it delivers an output signal to the amplifier. This signal is determined by the relationship of the compared signals. When the external and internally derived signals are in a predetermined balanced relationship, the detector 10 does not deliver a signal to the amplifier 22. When the signal over line 14 under balances the external signal received on line 12 of the high speed detector 10, the detector 10 delivers an output signal, to the discriminator 24 through the amplifier 22 characterized by this underbalanced relationship. If the signal on line 14 overbalances the signal of line 12 of the detector 10, the detector delivers an output signal to the discriminator 24 which is characterized by the overbalanced relationship.

Upon receipt of a signal indicating underbalance, the discriminator 24 when energized by the discriminator driver 26, produces an output signal on its line 28 and when it receives a signal indicating overbalance the discriminator 24 produces an output signal on its line 30 upon energization by the driver 26.

The output lines 28 and 30 of the discriminator 24 respectively energize the first input terminals of the forward and the backward gates 32 and 34. Thus under conditions of underbalance, the forward gate 32 delivers an output signal to its line 44 when it receives a timing signal from the blocking oscillator, while under conditions of overbalance the backward gate 34 delivers an output signal over its output line 48.

The delivery of an output signal to the flip-flop 46 from the forward gate 32 sets it in its forward state energizing its output line 50 which in turn delivers a signal to the binary counting device 55 over the forward control line 54. This sets the binary counting device 55 for counting in the forward direction. On the other hand, the delivery of an output signal from the backward gate 34 sets the flip-flop 46 to its backward state which results in the energization of its output lead 56. The signal from the output lead 56 energizes the backward control line 60 which conditions the binary counting device 55 for counting in the reverse or backward direction.

Output signals from either the forward gate 32 or the backward gate 34 energize the blocking oscillator 64 through the buffer 62. In order to stimulate the blocking oscillator 64 the amplitude of the signal delivered thereto must be sufficient to represent an unbalance of at least one count or possibly a predetermined fraction thereof for the purpose of adding stability to the apparatus. If the unbalance is sufficient for correction, the blocking oscillator passes a signal through a delay element 66 to the forward count line 68 of the binary counting device 55. The delay element provides a sufficient time delay for the counting device 55 to assume its required forward or backward counting state.

Thus under conditions of underbalance, the counting device 55 is set to its forward direction and if the underbalance is sufficient a signal is delivered to the counting device 55 to increase its count by one unit count. The increased count of the binary counting device 55 causes the converter 78 to deliver a corresponding output signal to the input line 14 of the high speed detector 10 which tends to balance the external input signal 12. In this way the count of the counting device 55 increases by one unit count each time the detector 10 is energized until the underbalance of the analog signal on the input terminal 14 is reduced to a state of balance with respect to the external signal received over the input terminal 16.

The apparatus operates in a similar manner when the signal delivered from the converter 78 to the high speed detector 10 overbalances the external signal received at terminal 16. In this case the signal periodically delivered by the detector 10 to the discriminator 24 energizes the backward gate which sets the flip-flop 46 to its backward state. This results in the counting device 55 reducing its count by one unit count each time a signal is delivered from the blocking oscillator 64. The reduced count of the binary counting device 55 is reflected in the output signal of the converter 78 which changes its value in the direction to balance the externally received signal. The process of reducing the count of the counting device 55 takes place each time the detector 10 is energized by the detector driver 18 until the overbalance condition is replaced by the balanced state.

By comparing the signal derived from the converter 78 with an external analog signal which may be continuously varying, the binary counter may have its count periodically increased or decreased to correspond with the received signal. The binary counting device 55 thereby provides at its output terminals 70, 72 and 74 a digital code which is a translation of the analog information received at the input terminal 16. This digital code information is constantly available so that it can be taken at random times without synchronization and is periodically corrected at a high rate (100,000 times per second) to correspond with the input analog signal.

The information translating apparatus takes advantage of the last translated information stored in the binary counting device 55 by changing its count to account only for changes in the information being translated. The efficiency and accuracy of operation of the apparatus is accomplished by this method since it is only necessary to change the count of the counting device 55 by increasing or decreasing it to correspond with the newly received information. If the received information is continuously varying then the change in the count will correspond to the change in the received analog information, rather than a change from zero value to the translation value. It is evident that the counting device 55 is accurately corrected and follows any change in the incoming signal which does not exceed the rate of one count for each periodic sampling of the incoming signal. It is noted that the illustrated apparatus uses a sampling or comparing frequency of 100 kilocycles. Of course, this period may be adjusted for the particular requirements of the apparatus being designed. The number of significant digits of the binary counter 55 may be increased, thereby increasing the accuracy of the translated information, by adding stages to the counting device 55. The number of significant places translated, the sampling or comparing frequency, and the rate at which the device can follow and accurately translate the incoming analog signals are all related and affect one another in the design of the equipment.

The apparatus may be used for determining the maximum or minimum values attained by a constantly varying analog signal which is delivered to the input terminal 16, in the following manner. To determine the maximum value attained by the varying analog signal, a permissive signal is delivered only to the control terminal 40 of the forward gate 32. The backward gate 34 is thus inhibited, and the forward gate will pass signals allowing the binary counting device 55 to increase its count when the output signal from the converter underbalances the externally derived signal on terminal 16. Since the count of the counting device 55 cannot be reduced it will show in digital form, the greatest value attained by the varying signal over a given period of time. Of course, the digital counter 55 should be initially set at zero value or at a value below the peak attained by the varying signal.

In a similar manner, for the determination of the lowest or minimum value attained over a given period of time by the varying signal delivered to the input terminal 16, a permissive signal is delivered only to the control terminal of the backward gate 34, while the forward gate 32 is inhibited by the lack of such a signal. In this case, only the backward gate 34 passes signals from the discriminator 24 causing the counting device 55 to indicate the lowest value attained by the varying signal. This is so since the counting device 55 cannot receive signals for counting in the forward direction. The count of the binary counting device 55 must be initially set at a value greater than the minimum value which is attained by the varying external signal for proper operation.

The information translating apparatus has been demonstrated thus far for converting analog information received at its input terminal 16 to digitally coded information delivered at the output lines 70, 72, 74 of the counting device 55. By removing the connecting plug 80, the apparatus may now, conversely, receive digitally coded information over the series of input leads 76 of the converter 78 and delivers an analog signal corresponding therewith over its output line 82. This conversion is achieved by utilizing the converter 78 already present in the apparatus and without the use of additional equipment. The apparatus thus provides in one unit, means for converting varying analog information to digital form, and is adjustable for converting varying external digital information to corresponding analog form. This feature increases the versatility and usefulness of the apparatus.

*Signal Comparing and Discriminator Circuits*

Refer now to FIGURE 2 which shows in schematic form the signal comparing and discriminator circuits of the information translating apparatus.

The detector 10 comprises a signal comparing network 100 and a diode bridge detecting circuit 101.

The signal comparing network 100 has series resistors 102 and 103 which are bridged between the signal input terminals 16 and 104. The signal input terminal 16 in this case is adapted for receiving externally derived analog signals such as, for example, a voltage or current signal which may vary in amplitude as a function of time.

The input terminal 104 receives similar signals which are derived internally from the information translating apparatus and may be in the form of a voltage or current or other such signals which may be a function of time.

The junction point of the resistors 102 and 103 is connected with an output line 106 of the signal comparing network 100.

The detecting circuit 101 comprises an input-output lead 108 connected with the output lead 106 of comparing network 101, a reference potential lead 110 returned to ground potential, and a pair of control terminals 112 and 114. A pair of diodes 116 and 118 have their anodes joined with the control terminal 112 and their cathodes respectively connected with the input-output lead 108 and the reference potential lead 110. A second pair of diodes 120 and 122 have their cathodes connected with the control terminal 114 and their anodes respectively joined with the input-output lead 108 and the potential reference lead 110. The diode 118 is shunted by a resistor 124, while the diode 122 is shunted by a resistor 126 for the purpose of reducing the capacitive effect and increasing the efficiency of operation of the diode bridge detecting circuit 101.

The control terminal 112 is connected through a lead resistor 128 with the cathode of a diode tube 130, while the control terminal 114 is connected through a lead resistor 132 with the anode of a second diode tube 134. The anode of tube 130 is joined to one end of the secondary winding of a signal transformer 136 while the cathode of the diode tube 134 is joined to the other end of the secondary winding. The secondary winding of the transformer 136 is bridged by an adjustable center tap resistor 138 which has its center tap returned to ground potential.

*Detector Driver and Oscillator Circuits*

The detector driver 18 energizes the primary winding of the transformer 136 in response to an input signal derived from the oscillator 20. The secondary winding of transformer 136 is connected for signal inversion.

The oscillator 20 includes a triode tube 140 which has its anode returned to a negative potential of 195 volts through a parallel connected resistor-inductor combination 142, while its control electrode is returned to the anode by a grid resistor 144 in series with an inductor 146 and capacitor 148. The control element of tube 140 is also connected with a negative potential of 195 volts by the grid resistor 144 and a series resistor 150, and with a negative potential of 400 volts through the resistor 144 in series with a parallel resistor-capacitor combination 152 and a series resistor 154. The cathode of tube 140 is directly linked with the negative potential of 400 volts.

The oscillator 20 developes a sine wave voltage signal at the anode of the tube 140 which is transmitted by the capacitor 148 and a grid resistor 158 to the control element of a clipping tube 156. The anode of tube 156 is returned through a series resistor 160 and inductor 162 to the negative potential of 195 volts, while its cathode is directly linked with the negative potential of 400 volts.

The clipper tube 156 is driven by the oscillator signal which may have a frequency of 100 kilocycles and operates to produce a substantially square wave signal at its anode. The square wave signal at the anode of tube 156 is delivered by a capacitor 164 to the control electrode of the tube 166 of the detector driver 18.

The control electrode of tube 166 is returned to a negative potential of 400 volts by the grid resistor 168 and an input load resistor 170. The resistor 170 is bridged by a diode 172 which has its cathode joined to the negative potential of 400 volts. The cathode of tube 166 is returned through a cathode resistor 174 to the negative potential of 400 volts, while its anode is connected with the negative potential of 195 volts through the primary winding of the transformer 136. The effect of the diode 172 is to limit the positive excursion of the signal delivered to the control electrode of the tube 166.

Operation of the Oscillator and Detector Circuits

In operation, the square wave signals delivered to the tube 166 causes it to develop similar signals in its anode circuit for energizing the primary winding of the transformer 136.

The signal delivered to the secondary of the pulse transformer 136 is balanced above and below ground by adjustment of the center tap of the load resistor 138.

When the secondary winding of the pulse transformer 136 delivers a signal to the anode of diode tube 130 which is positive with respect to ground, and a signal which is negative with respect to ground is delivered to the cathode of diode 134, these tubes become conductive. When this occurs, a positive signal with respect to ground is delivered to the control terminal 112 and a negative signal with respect to ground is delivered to the control terminal 114. This results in the conduction of the four bridge diodes 116, 118, 120 and 122. Under these circumstances, the input-output line 108 of the bridge circuit 101 is maintained at the same potential as the potential reference lead 110 which is at ground level.

When the transformer delivers a voltage to the anode of tube 130 which is negative with respect to ground and a voltage to the cathode of tube 134 which is positive with respect to ground, these tubes become non-conducting. At this time, the input-output line 108 is no longer maintained at ground potential, and attains a potential depending upon the values of the respective signals received by the input terminals 16 and 104 of the balancing network 100.

Thus, for example, when a positive potential signal is delivered to the input terminal 16 and a corresponding negative potential signal is delivered to the input terminal 104 which balances the signal delivered to the terminal 16, then the signal upon its output lead 106 which is joined with the input-output lead 108 remains at ground potential. However, if the signal delivered to the input terminal 104 is not sufficiently negative, so that it underbalances the positive signal delivered to the terminal 16, then the output signal on lines 106 and 108 will be positive with respect to ground. Conversely, if the signal delivered to the input terminal 104 is more negative than required and overbalances the positive signal voltage delivered to the input terminal 16, then a negative potential signal with respect to ground will be delivered to the output line 106 and input-output line 108.

When the tubes 130 and 134 become conductive again, the signal developed on the input-output line 108 is quickly returned to ground potential. In fact, it is possible to return the developed signal to ground potential at a faster rate than it takes for the signal to be developed after the tubes 130 and 134 become non-conductive and the line 108 is not clamped at ground potential.

Thus the effect of the periodic conduction and non-conduction of tubes 130, 134 is to periodically produce output signals which are related to the respective values of the input signals at the terminals 16 and 104. These output signals are periodically returned to the ground or reference potential. The sampling and comparison of the input signals which are concurrently received at the input terminals takes place at the oscillator frequency, in this case 100,000 times each second.

It is noted that a positive-going error pulse is produced by the detector 10 when the signal delivered to the input terminal 104 underbalances a positive signal delivered to the input terminal 16, whereas a negative-going error signal is produced having an amplitude determined by the degree of overbalance.

Amplifier Circuit

The control electrode of tube 176 of amplifier 22 receives the pulse signals developed at the input-output line 108 of the detector 10 through a grid resistor 178. The tube 176 is normally conducting and has its anode returned to a positive potential of 150 volts through a series resistor 180 and inductor 182. The screen electrode is directly returned to the positive potential of 150 volts, while the suppressor electrode is linked to the cathode of tube 176 and is returned through a cathode resistor 184 to ground potential.

The tube 176 amplifies the signal received and produces an inverted signal at its anode. This anode signal is transmitted to the control electrode of the amplifier tube 190 by charging capacitor 186 in series with a grid resistor 188. The capacitor 186 may be 200 micro-microfarads while a resistor 192 may have a value of 100,000 ohms. The capacitor 186 has its junction with the grid resistor 188 returned to ground potential through the load resistor 192.

The anode of tube 190 is returned to the positive potential of 150 volts through a series resistor 195 and inductor 196, while its screen electrode is directly returned to this potential. The suppressor electrode is joined to the cathode of tube 190 which is linked to ground by a cathode resistor 198. The cathode of tube 190 is joined to the cathode of tube 196 by a positive feed-back resistor 200 which may be utilized to increase the gain of the amplifier 22.

In operation, the amplifier serves to produce an output signal comprising two pulse signals due to the charging and discharging of capacitor 186 responsive to the square wave input signal received from the detector 10. Thus, if a positive pulse is received from the detector 10 which corresponds to an underbalanced condition of the input signal at terminal 104 with respect to the signal at terminal 16, the amplifier 22 will develop an output signal at the anode of tube 190 which has a differentiated positive-going pulse corresponding to the leading edge of the input wave and a differentiated negative-going pulse corresponding to the trailing edge of the wave. Since the rise time of the pulse is greater than the fall time for its trailing edge, the differentiated negative-going pulse will have a greater amplitude than the amplitude of its preceding positive-going pulse developed by capacitor 186.

Discriminator Circuit

The pulse signals developed at the anode of tube 190 are delivered by a coupling capacitor 202 and grid resistor 204 to the control electrode of a normally conducting tube 206. The junction of the capacitor 202 and resistor 204 is returned to a negative potential of 400 volts through series resistors 208 and 212, while the cathode of tube 206 is returned to this potential through the series resistors 210 and 212. The anode of tube 206 is returned to the negative potential of 195 volts by a resistor 274 and develops an amplified inverted signal at its anode which is delivered through a coupling capacitor 216 to the input-output line 28 of a diode detector unit 220 of the discriminator 24.

The detector unit 220 is also provided with a reference potential lead 222 which is maintained at a negative potential of 420 volts, and a pair of control terminals 224 and 226. A pair of diodes 228, 230 have their anodes connected with the control terminal 224 and their cathodes respectively joined with the input-output lead 28 and the reference potential lead 222. The second pair of diodes 232 and 234 have their cathodes joined to the control terminal 226 and their anodes respectively connected with the input-output lead 28 and the potential reference lead 222.

A second signal is derived from the junction of the cathode resistors 210 and 212 of the tube 206 and is directly related to the input signal applied to tube 206. This signal is transmitted through a coupling capacitor 242 to the input-output lead 30 of a second detector unit 244 of the discriminator 24.

The detector unit 244 is also provided with a reference potential lead 246 which is maintained at the negative potential of 420 volts, and a pair of control terminals 248 and 250. A pair of diodes 252, 254 have their anodes joined to the control terminal 248 and their cathodes respectively connected to the input-output lead 30 and the reference potential lead 246. A second pair of diodes 256, 258 have their cathodes joined to the control terminal 250 and their anodes respectively connected with the input-output lead 30 and the reference potential lead 246.

The control terminals 224 and 226 of the detector unit 220 are respectively joined through load resistors 236 and 238 with the ends 237 and 239 of the secondary winding of a pulse transformer 240, while the terminals 248, 250 of the detector unit 244 are respectively joined through load resistors 260, 262 with said winding.

The center tap of the secondary or output winding of the transformer 240 is returned to a negative potential of 420 volts and its ends 237, 239 are bridged by a resistor 276 in series with a diode 278. The diode 278 has its cathode joined with the end 237 of the secondary winding of the transformer 240.

Discriminator Driver Circuit

The discriminator driver 26 is provided with a tube 264 which has its anode returned to a negative potential of 195 volts through the primary winding of transformer 240. The control electrode of tube 264 derives a square wave signal from the anode of clipper tube 156 through a coupling capacitor 266 and resistor 268. The junction of capacitor 266 and resistor 268 is returned by an input resistor 270 to a negative potential of 400 volts. The resistor 270 is bridged by a diode 272 which has its cathode joined to the negative potential of 400 volts.

Operation of Discriminator and Discriminator Driver Circuits

In operation, the square wave signal delivered to the control electrode of the tube 264 produces alternately positive and negative voltage excursions across the ends 237, 239 of the output winding of the transformer 240. The diode 272 limits the positive excursion of the signal delivered to the control electrode of tube 264 thereby increasing the effectiveness of the pulse signals delivered. The resistor 276 and diode 278 balance the load on the transformer 240 and shape the signals which are developed.

When the signal at the output of the transformer 240 makes its end 237 positive with respect to its end 239, the control terminal 224 is positive with respect to the control terminal 226 of the detector unit 220. This results in the conduction of the diodes 228, 230, 232 and 234 producing an output voltage level on the input-output line 28 which is the same as the reference potential on line 222 (−420 volts).

When the energizing signal derived from the transformer 240 is reversed so that the control terminal 224 is negative with respect to the control terminal 226, this condition does not apply, the signals produced at the input-output lead 28 being determined by the pulse signals developed at the anode of the tube 206.

Since the second detector unit 244 is similar to the detector unit 220 and is connected in parallel to receive energization from the output winding of the transformer 240, it operates in a like manner. Thus when its control terminal 248 is positive with respect to the control terminal 250, the bridge diodes 252, 254, 256 and 258 are conductive thereby maintaining its input-output lead 30 at the reference potential on the lead 246. When this condition is reversed and the control terminal 248 is negative with respect to the control terminal 250, the input-output lead 30 will deliver a pulse signal derived from the cathode circuit of the tube 206. This signal will be inverted with respect to the signal at the input-output line 28.

It is important to note the phase relationship of the signals derived from the tube 206 and the energizing signals delivered to the detector units 220, 224 by the transformer 240. The voltage signal delivered across the control terminals 112, 114 of the detector circuit 101 is 180 degrees out of phase with the signals delivered across the control terminals 248 and 250 of the detector unit 244. This causes the units 220 and 224 to be conductive when the leading pulse signal is delivered and non-conductive when the trailing pulse signal is delivered by the tube 206.

The phase relationship is such that the bridge diodes of detector circuit 101 are non-conductive at the time when the bridge diodes of the detector units 220 and 224 are conductive. This means that the input-output leads 28 and 30 of the detectors 220 and 224 are maintained at the reference potential and do not deliver the leading pulse signals developed in the anode circuit of tube 206.

However, when the bridge diodes of the detector circuit 101 become conductive, the bridge diodes of detector units 220 and 244 are non-conducting. Thereby the pulse signal derived from the trailing edge of the signal developed by the detector circuit 101, is transmitted over the input-output lines 28 and 30 of the discriminator 24. For example, if a positive-going signal is developed when the bridge diodes of detector 101 are energized to their non-conductive states, a signal will be delivered by the input-output lines of the discriminator corresponding only to the pulse signal developed by the trailing edge of this signal.

Since the trailing edge of this signal, which is produced by the return to ground potential of the signal from the detector circuit 101, has a greater slope than that of its leading edge, a larger pulse signal is produced which is more representative of the amplitude of the output signal of the detector 101 achieving a high degree of accuracy.

Of course, it is also possible by using in phase excitation of the detector circuit 101 and detector units 220 and 240, to produce a signal on the input-output lines of the discriminator 28, 30 which is the pulse derived from the leading edge of the output signal of detector circuit 101.

Although the signals delivered by the leads 28, 30 of the discriminator 24 are similar, they are inverted, so that if the signal on line 28 is positive-going, the pulse developed on line 30 is negative-going.

Delay and Blocking Oscillator Circuits

The square wave signal developed in the anode circuit of tube 166 of the detector driver 18 is also transmitted to the control element of a cathode follower tube 284 through a coupling capacitor 280 and a grid resistor 282. An input resistor 281 returns the junction of the capacitor 280 and resistor 282 to a negative potential of 400 volts, while a diode 283 is connected across resistor 281 and has its cathode joined with the negative potential of 400 volts. The anode of tube 284 is linked to a negative potential of 195 volts, while its cathode is returned through a cathode resistor 286 to a negative potential of 680 volts.

A resistor 288 delivers the signal developed in the cathode of tube 284 to the resistor 290 of the delay network 38. The output end of the delay resistor 290 is connected to a negative potential of 400 volts through the delay circuit capacitor 292.

The junction between resistors 288 and 290 is clamped by a diode 294 which has its cathode returned to a negative potential of 400 volts and by a diode 296 which has its anode returned to a negative voltage of 420 volts.

The signal developed at the output of the delay network 38 is delivered through the primary winding of a transformer 294 to the control element of the tube 296 of the blocking oscillator 36. The anode of the tube 296 is returned to a negative potential of 195 volts through the secondary or output winding of the transformer 294 which is connected for phase inversion while its cathode is returned through a cathode resistor 298 to a negative potential of 400 volts.

In operation, the input square wave signal to the cathode follower tube 284 develops a square wave signal in its cathode circuit which is delivered to the delay network 38. The signal presented to the delay network 38 can vary between the negative potentials of 400 volts and 420 volts as limited by the clamping diodes 294, 296. The signals delivered by the network 38 are delayed for 2 microseconds and excite the blocking oscillator tube 296 which delivers positive-going gating signals to the output line 300.

*Summary of Operation*

The input signals delivered to the terminals 16 and 104 are compared by the network 109 which delivers a positive or negative signal depending upon whether the internally derived signal underbalances or overbalances the externally derived signal on the terminal 16. The amplitude of this signal is directly related to the degree of unbalance.

The signal on the output line 106 corresponding to the compared input analog signals is allowed to develop only when the diodes of the bridge detector circuit 101 are non-conducting. When the diodes become conducting the signal on the line 106 is reduced to ground potential.

If the compared signals are in balance no signal is delivered to the amplifier 22. However, if the signals are overbalanced or underbalanced, a signal is passed through the amplifier to the tube 206 which drives the inputs of the detector units 220 and 244.

The amplifier 22 also serves to produce pulse signals of the leading and trailing edges of the input square wave signal having amplitudes responsive to the amplitude of the square wave input signal. The detector units 220 and 244 of discriminator 24 are energized to pass the trailing pulse signal received from the amplifier 22.

If the signal balancing network 109 is underbalanced the detector unit 220 sends a positive gating signal over the lead 28 to the forward gate 32 which triggers the flip-flop 46 to its forward state. If the signal balancing network 109 is overbalanced, the detector unit 244 of discriminator 24 delivers a positive-going signal over its output lead 30 to the backward gate 34 which switches the flip-flop 46 to its backward state.

The forward and backward gates 32 and 34 are timed by a gating signal derived from the blocking oscillator 36 which receives delayed excitation derived in common with the detector 10 and the discriminator 24 from the oscillator 20 which in this case operates at a frequency of 100 kilocycles.

When the flip-flop 46 is in its forward state, the forward and backward cathode followers 52 and 58 develop output signals over their respective control lines 54, 60 which when delivered to the terminals F and B condition the flip-flop or bistable networks 540 so that the binary counting device 55 counts in the forward direction.

Conversely, when the flip-flop 46 is in the backward state, the signals delivered over the output control lines 54, 60 are such that the binary counting device 55 is conditioned to count in the backward direction.

The output signals from the forward and backward gates 32, 34 are delivered through the buffer 62 to the input of the blocking oscillator 64 which delivers an input count pulse to the binary counting device 55 if the amplitude of the input signal exceeds its threshold value. This signal increases or decreases the count of the counting device 55 depending upon whether the device 55 is conditioned for forward or backward operation.

The sets of output leads 70 and 72 of the counting device 55 deliver digital bipolar output signals representing the count of the counting device 55. This information is also transmitted by the output terminals 74 to the input terminals 76 of the converter 78 which provides the analog or voltage association which is delivered to the input terminals 104 of the comparing network.

The operation of the information translating apparatus is such that an unbalanced condition at its comparing network 109 results in changing the stored count of the binary counting device 55 so that the signal delivered to the input terminal 104 is changed in the direction to balance the signal received at its terminal 16. In this manner, the count of the counting device 55 changes to follow the input signal at terminal 16 and thereby provides digitally coded output signals.

It is intended that this invention be not limited to the specific embodiment illustrated and described since modifications and variations which do not depart from the essence of the invention may be made by those knowledgable in the art of electronic circuitry. Rather, it is intended that the scope of the invention be construed in accordance with the appended claims.

What is claimed is:

1. Signal comparing means comprising a signal balancing network having first and second input terminals, means for applying first and second signals for comparison to said first and second input terminals respectively, and an output terminal delivering a signal related to the signals at its input terminals; a first detecting circuit having an input lead connecting with the output terminal of said balancing network, and an output lead; signal generating means periodically energizing said first detecting circuit; said first detecting circuit when energized producing a positive-going signal at its output lead when the signal at its input lead is above a predetermined value and producing a negative-going signal when the signal at its input lead is below said predetermined value; second and third detecting circuits periodically energized by said generating means and each having an input lead deriving a signal from the output lead of said first detecting circuit, and an output lead; said second detecting circuit when energized by said generating means producing a positive-going output signal only when said first detecting circuit produces a positive-going output signal; said third detecting circuit when energized by said generating means producing a positive-going output signal only when said first detecting circuit produces a negative-going output signal.

2. Signal comparing means comprising a signal balancing network having first and second input terminals respectively adapted to receive amplitude modulated signals for comparison, an output terminal, a first resistance element connected between the first input terminal and the output terminal, and a second resistance element connected between the second input terminal and the output terminal; a first detecting circuit having an input-output lead connected with the output terminal of said balancing network, a signal reference lead maintained at a predetermined signal level, first and second control terminals, a first pair of diode elements each having its anode joined with the first control terminal and its cathode connected with a respective one of said leads, and a second pair of diode elements each having its cathode joined with the second control terminal and its anode connected with a respective one of said leads; second and third detecting circuits each having an input-output lead, a signal reference lead maintained at a predetermined signal level, first and second control terminals, a first pair of diode elements each having its anode joined with the first control terminal and its cathode connected with a respective one of said leads, and a second pair of diode elements each having its cathode joined with the second control terminal and its anode connected with a respective one of said leads; the input-output leads of said second and third detecting circuits respectively deriving signals from the input-output lead of said first detecting circuit; and signal generating means periodically energizing the control terminals of said first, second and third detecting circuits.

3. Signal comparing means comprising a signal balancing network having first and second input terminals respectively adapted to receive amplitude modulated signals for comparison, an output terminal, a first resistance element connected between the first input terminal and the output terminal, and a second resistance element connected between the second input terminal and the output terminal; first, second and third detecting circuits each having an input-output lead, a signal reference lead maintained at a predetermined potential level, first and second control terminals, a first pair of diode elements each having its anode joined with the first control terminal and its cathode connected with a respective one of said leads, and a second pair of diode elements each having its cathode joined with the second control terminal and its anode connected with a respective one of said leads; signal generating means energizing said detecting circuits except when it periodically delivers a signal to the control terminals of each of said detecting circuits rendering the potential of said first control terminal positive and said second control terminal negative with respect to the reference potential level; said detecting circuits upon being energized each producing a positive-going signal at its input-output lead when a signal having a potential more positive than that of the reference potential level is delivered thereto, and producing a negative-going signal when a signal having a potential less positive than that of said reference potential level is delivered thereto; the input-output lead of each of said detecting circuits being maintained at the reference potential level when its control terminals are not energized by said generating means; the input-output lead of said first detecting circuit being connected with the output terminal of said balancing network; a signal connection joining the input-output lines of said first and second detecting circuits; and a signal inverting connection linking the input-output lines of said first and third detecting circuits.

4. Signal detecting means comprising a diode bridge signal detecting unit having an input terminal adapted to receive amplitude modulated signals, and an output terminal; signal generating means periodically energizing said detecting unit to sample the signal received by its input terminal; said detecting unit when energized delivering a signal to its output terminal having an amplitude determined by the relationship of the amplitude of said sampled signal to a predetermined value; and a signal discriminating network including first and second diode bridge signal detecting circuits each having an input lead respectively deriving signals from the output terminal of said detecting unit, and an output lead; said detecting circuits being periodically energized by said generating means; said first detecting circuit when energized producing a control signal at its output lead only when the amplitude of the signal at the output terminal of said detecting unit is above a predetermined value; said second detecting circuit when energized producing a control signal at its output lead only when the amplitude of the signal at the output terminal of said detecting unit is below said predetermined value.

5. Signal detecting means comprising a first detecting circuit having an input-output lead adapted to receive amplitude modulated signals, a signal reference lead maintained at a predetermined signal level, first and second control terminals, a first pair of diode elements each having its anode joined with the first control terminal and its cathode connected with a respective one of said leads, and a second pair of diode elements each having its cathode joined with the second control terminal and its anode connected with a respective one of said leads; second and third detecting circuits each having an input-output lead, a signal reference lead maintained at a predetermined signal level, first and second control terminals, a first pair of diode elements each having its anode joined with the first control terminal and its cathode connected with a respective one of said leads, and a second pair of diode elements each having its cathode joined with the second control terminal and its anode connected with a respective one of said leads; the input-output leads of said second and third detecting circuits respectively deriving signals from the input-output lead of said first detecting circuit; and signal generating means periodically energizing the control terminals of said first, second and third detecting circuits.

6. Signal detecting means comprising first, second and third detecting circuits each having an input-output lead, a signal reference lead maintained at a predetermined potential level, first and second control terminals, a first pair of diode elements each having its anode joined with the first control terminal and its cathode connected with a respective one of said leads, and a second pair of diode elements each having its cathode joined with the second control terminal and its anode connected with a respective one of said leads; signal generating means energizing said detecting circuits except when it periodically delivers a signal to the control terminals of each of said detecting circuits rendering the potential of said first control terminal positive and said second control terminal negative with respect to the reference potential level; said detecting circuits upon being energized producing a positive-going signal at its input-output lead when a signal having a potential more positive than that of the reference potential level is delivered thereto, and producing a negative-going signal when a signal having a potential less positive than that of said reference potential level is delivered thereto; the input-output lead of each of said detecting circuits being maintained at the reference potential level when its control terminals are not energized by said generating means; the input-output lead of said first detecting circuit being adapted to receive amplitude modulated signals; a signal connection joining the input-output lines of said first and second detecting circuits; and a signal inverting connection linking the input-output lines of said first and third detecting circuits.

7. A signal comparing device comprising a signal balancing network having first and second input terminals respectively adapted to receive amplitude modulated signals for comparison, an output terminal, a first resistance element connected between the first input terminal and the output terminal, and a second resistance element connected between the second input terminal and the output terminal; a detecting circuit having an input-output lead connected with the output terminal of said balancing network, a signal reference lead maintained at a predetermined signal level, first and second control terminals, a first pair of diode elements each having its anode joined with the first control terminal and its cathode connected with a respective one of said leads, and a second pair of diode elements each having its cathode joined with the second control terminal and its anode connected with a respective one of said leads; and signal generating means periodically energizing the control terminals of said detecting circuit.

8. A signal comparing device comprising a signal balancing network having first and second input terminals respectively adapted to receive amplitude modulated signals for comparison, an output terminal, a first resistance element connected between the first input terminal and the output terminal, and a second resistance element connected between the second input terminal and the output terminal; a detecting circuit having an input-output lead connected with the output terminal of said balancing network, a signal reference lead maintained at a predetermined potential level, first and second control terminals, a first pair of diode elements each having its anode joined with the first control terminal and its cathode connected with a respective one of said leads, and a second pair of diode elements each having its cathode joined with the second control terminal and its anode connected with a respective one of said leads; and signal generating means energizing said detecting circuits except when it periodically delivers a signal to the control terminals of said detecting circuit rendering the potential of said first control terminal positive and said second control terminal negative with respect to the reference potential level; said detecting circuit upon being energized producing a positive-going signal at its input-output lead when a signal having a potential more positive than that of the reference potential level is delivered thereto, and producing a negative-going signal when a signal having a potential less positive than that of said reference potential level is delivered thereto; the input-output lead being maintained at the reference potential level when its control terminals are not energized by said generating means.

9. A device for comparing the amplitudes of a pair of input signals comprising a network having said input signals applied thereto, said network in response to an unbalance of said input signals providing an unbalance signal whose polarity is determined by the sense of unbalance of the two compared signals, means connected to said network for intermittently interrupting said unbalance signal to provide unbalance pulses, a differentiator responsive to said unbalance pulses for deriving differentiated pulses therefrom, means responsive to said differentiated pulses for providing two oppositely phased outputs, first and second gates, each of said gates have a different one of said phased outputs applied thereto, and means for simultaneously opening said gates to pass said differentiated pulses.

10. A device for comparing the amplitudes of two input signals comprising a network having said input signals applied thereto, said network providing an unbalance signal whose polarity is determined by the sense of unbalance of the two signals, a timing signal source, means connected to said network and responsive to timing signals from said source for chopping said unbalance signal to provide unbalance pulses, a differentiator responsive to said unbalance pulses for deriving differentiated pulses therefrom, means responsive to said differentiated pulses for providing two oppositely phased outputs, a first clamp having one of said phased outputs applied thereto, a second clamp having the other of said phase outputs applied thereto, and means responsive to timing signals from said source for intermittently and simultaneously opening said first and second clamps to permit passage of said phased outputs from said device.

References Cited in the file of this patent

UNITED STATES PATENTS

| | | |
|---|---|---|
| 2,660,618 | Aigrain | Nov. 24, 1953 |
| 2,788,450 | Sunstein et al. | Apr. 9, 1957 |
| 2,836,356 | Forrest el al. | May 27, 1958 |
| 2,858,425 | Gordon | Oct. 28, 1958 |
| 2,865,564 | Kaiser et al. | Dec. 23, 1958 |
| 2,866,092 | Raynsford | Dec. 23, 1958 |
| 2,870,327 | MacWilliams et al. | Jan. 20, 1959 |
| 2,873,364 | Huddleston et al. | Feb. 10, 1959 |
| 2,880,392 | Paulsen | Mar. 31, 1959 |